United States Patent Office 2,818,405
Patented Dec. 31, 1957

2,818,405

ELASTOMERIC REACTION PRODUCTS OF BIS-MALEIMIDES WITH ORGANIC DIAMINES

Peter Kovacic, Mayfield Village, Ohio, assignor to E. I. du Pont de Nemours and Company, Wilmington, Del., a corporation of Delaware No Drawing. Application November 21, 1956
Serial No. 623,552

7 Claims. (Cl. 260—78)

This invention relates to elastomeric products and more particularly to elastomeric products containing in the molecule high formula weight radicals containing long hydrocarbon chains which are prepared from bismaleimides and organic diamines.

Various processes have been proposed for the preparation of rubber-like, elastomeric materials; however, these processes have not been entirely satisfactory since they do not permit the preparation of solid elastomers directly from fluid mixtures, which mixtures could be converted by heat to finished elastomers. This ability of being able to prepare elastomers by merely heating fluid mixtures would make it possible to introduce into a mold or other cavity the fluid mixture and then convert it into the elastomer. Thus, the elastomer could be introduced as a liquid into places inaccessible to the corresponding solid elastomers and, accordingly, these fluid mixtures would greatly extend the field of application of elastomers of this kind by making them available as caulking compounds and casting compositions.

It is an object of this invention to provide novel elastomeric compositions. A further object is to provide novel elastomeric compositions containing in the molecule high formula weight radicals containing long hydrocarbon chains. A still further object is to provide liquid compositions which may be converted to these novel elastomeric compositions. Other objects will appear hereinafter.

These and other objects of the following invention are accomplished by the liquid compositions comprising an intimate mixture of (1) a bismaleimide of the structure

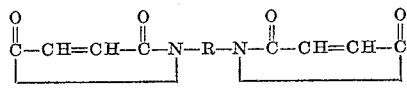

wherein R is a bivalent hydrocarbon radical and (2) a liquid organic diamine, $H_2N-R'-NH_2$, having a molecular weight of between 750 and 12,000, wherein R' is a bivalent polymeric radical selected from the group consisting of (a) radicals obtained by the polymerization of ethylenically unsaturated monomers at least 50% of which are conjugated dienes and (b) the corresponding hydrogenated radicals; said ethylenically unsaturated monomers being selected from the group consisting of hydrocarbon monomers and halogen-substituted hydrocarbon monomers. In addition to the two components which comprise the novel compositions of the present invention, a third component, namely an organic triamine, may be present. These liquid compositions are converted to elastomeric compositions by the application of heat.

The individual components which make up these novel liquid compositions should be present in equimolar proportions, i. e., there should be enough of the bismaleimide present to react completely with all of the amine groups of the organic diamine and any triamine which may be present. The reaction involved is the addition of the active hydrogen of the amine groups to the activated carbon-to-carbon double bonds of the bismaleimide structure. The individual components should be intimately mixed so that the bismaleimide is dispersed as fine particles in the liquid diamine reactant to form a uniform, viscous fluid which is stable for many hours at ordinary temperatures and which can be readily poured into molds. When these fluid compositions are heated for a relatively short period at about 100° C. or above, a rubber-like mass of excellent physical properties is formed, without appreciable shrinkage.

When the bismaleimide is heated with the liquid polymeric organic diamine, a chain extension of the diamine results. This type of reaction is more particularly illustrated as follows:

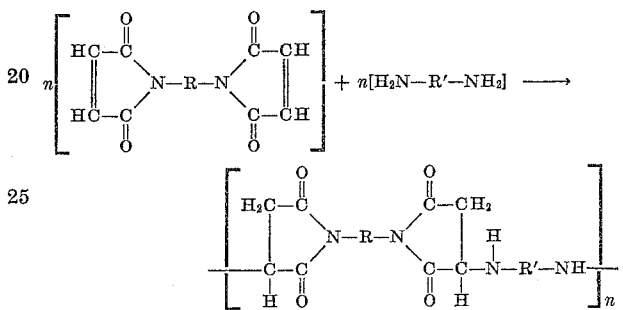

wherein R and R' have the significance defined above. It is quite apparent that the principal reaction of the bismaleimides involves the addition of the amino group to the activated carbon-to-carbon double bond of the maleimide structure. Thus the polymeric organic diamine compounds are chain extended by means of the bismaleimide. When triamines are also present, they take the place of part of the polymeric diamines in this chain formation and thus introduce extra amino groups into the chain. These extra amino groups in turn react with more of the bismaleimide in order to form a cross-linked material.

As pointed out above, the amount of bismaleimide to be used should be approximately equal to that which is calculated to react completely with all the amine groups of the polymeric diamine and, if present, of the organic triamine. This calculation is based on the fact that one maleimide residue will react with one amino group. It is to be understood that the function of the organic triamine is to cross link the individual chains and since excessive cross linking tends to lead to products which are no longer rubber and are brittle, the proportion of triamine should not be more than one mol per mol of polymeric diamine reactant. In terms of percent by weight, the amount of triamine used should not exceed more than about 10% by weight of the polymeric diamine reactant.

The bismaleimides which are used in the compositions of the present invention have the formula

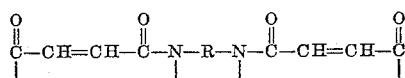

wherein R is a bivalent hydrocarbon radical. This radical may be either aliphatic, cycloaliphatic or aromatic and should be free of active hydrogen-containing functional groups. For purposes of the present invention, the aromatic radicals are preferred. Examples of suitable bivalent radicals are: ethylene, hexamethylene, decamethylene and cyclohexylene, o-, m-, and p-phenylene, tolylene and naphthylene radicals. The bismaleimides are conveniently made by the reaction of the corresponding diamine with two mols of maleic anhydride to form the bismaleamic acids

HOOC—CH=CH—CO—NH—R—NH—CO—CH=CH—COOH which are then heated with glacial acetic acid and sodium acetate to form the bismaleimides. They are crystalline solids, only slightly soluble in most organic solvents.

The liquid polymeric organic diamines which are used in the present invention are ordinarily most conveniently made by polymerizing the appropriate polymerizable, ethylenically unsaturated monomers, at least half of which are conjugated dienes, in the presence of certain free radicals, as more fully discussed below. This yields long hydrocarbon chains having terminal groups readily convertible to the desired amino groups by known chemical transformations. The unsaturated polymers which result from this polymerization may be hydrogenated by conventional methods of hydrogenation so as to produce essentially saturated polymeric diamines which may be used to prepare the novel compositions of the present invention. The most suitable ethylenically unsaturated monomers which may be polymerized are conjugated dienes, such as butadiene, isoprene, 2,3-dimethyl butadiene, chloroprene (2-chlorobutadiene), fluoroprene, bromoprene and the like. Mixtures of these conjugated dienes with minor amounts of other polymerizable ethylenically unsaturated compounds may be used. For example, styrene or isobutylene may be copolymerized with the dienes to form the long chain carbon skeletons. In all these polymeric products, the main chain will contain side chains to a greater or less extent. These will, of course, result when radicals are attached to the ethylenic system which takes part in the chain formation. Thus phenyl and methyl side chains in the polymer result from the phenyl of the styrene and the methyl of the isoprene, respectively. Similarly, vinyl and other unsaturated side chains result to some extent from butadiene and other conjugated dienes reacting by 1,2 addition. The principal mode of addition of the dienes is 1,4, however, yielding polymers in which the basic unit is

—CH$_2$—CH=CH—CH$_2$— or its substitution product such as

CH$_2$—CCH$_3$=CH—CH$_2$— from isoprene and

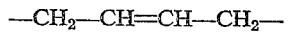

from 2-chlorobutadiene-1,3. In the butadiene polymers made by the procedures used for making the bifunctional compounds used in the present invention, the skeleton on the average contains one side chain for each 18 carbon atoms in the principal chain. In the polymerization of chloroprene, only one side chain is formed for about 130 carbon atoms in the chain, on the average. The unsaturated products of the diene polymerizations are readily hydrogenated. Thus, butadiene, for example, may be used as the starting material for either saturated or unsaturated long chain polymeric diamines.

A convenient source of free radicals for making the above polymeric diamines by polymerization are the aliphatic azo dinitriles in which the carbons attached to the azo group are tertiary, having the general formula:

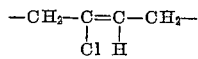

These compounds yield nitrogen and free radicals corresponding to the groups originally attached to the azo group. On heating the ethylenically unsaturated compounds with the azo compounds, the free radicals generated take part in the polymerization, the result being a polymer chain terminated at each end by the free radical. Thus, with butadiene and α,α'-azo diisobutyronitrile the product is

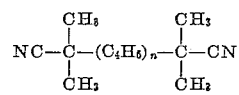

This may then be hydrogenated according to the corresponding saturated diamine which, when its molecular weight is between 750 and 12,000, is particularly suitable in the present invention. The desired molecular weight may be obtained by a proper choice of the ratio of monomer to azo compound, the higher ratios giving the longer chains. When the dinitrile is reacted with lithium aluminum hydride, LiAlH$_4$, instead of being hydrogenated, only the nitrile groups are affected and the product is an unsaturated diamine, retaining the —CH$_2$—CH=CH—CH$_2$— units in the chain.

The polymeric diamines containing long hydrocarbon chains may also be made by the conventional synthetic methods, such as converting a long chain dicarboxylic acid to the corresponding omega bromo monocarboxylic acid, converting this to the dicarboxylic acid with double the number of carbon atoms by eliminating bromine, repeating the series of operations, and finally converting the dicarboxylic acid to the diamine. Such methods, when applied as here to building up compounds of high molecular weight, are laborious but have the advantage of yielding products which are chemical individuals, of precise molecular weight and definite side chain structure or entirely free from side chains. On the other hand, the mixtures produced by polymerization are usually cheaper and more readily available and, in addition, often give products with superior properties.

The organic triamines which may be used in the novel compositions of the present invention tend to give the resulting elastomers greater tensile strength and modulus since they function as cross linking agents; however, it is to be understood that satisfactory elastomers are obtained in the absence of these triamines. Suitable triamines are diethylene triamine, 1,2,3-triamino propane, and the triamino benzenes and toluenes. Thus, they may be either aliphatic or aromatic and the amino groups may be either primary or secondary.

The following examples will better illustrate the nature of the present invention; however, the invention is not intended to be limited to these examples.

In these examples the compositions are made up by milling the ingredients on a three-roll ink mill until a fine dispersion of the solids in the viscous diamine is obtained. The dispersion is put under vacuum to remove occluded air which would form bubbles on curing unless removed. In order to convert this composition into rubber in a form that can be readily tested, it is cast in films 0.007 inch thick and cured by heating at 140° C. The physical properties are then determined. The results are shown below. Parts are by weight unless otherwise indicated.

EXAMPLES 1, 2 AND 3

A. *Preparation of diamino polymer of chloroprene*

600 parts of 2-chlorobutadiene-1,3, 1565 parts of toluene, 98.5 parts of α,α'-azo-bis-isobutyronitrile and 6 parts of alkylated phenol antioxidant are placed in a reaction vessel which is then closed and agitated for 4.5 hours at 88–90° C. The vessel is then cooled and vented and the excess monomer distilled off. 615 parts of dicyanopolychloroprene is obtained as a viscous liquid.

This polymer is dissolved in 1360 parts of diethylether and slowly added to 61 parts of lithium aluminum hydride in 2720 parts of refluxing diethylether. Refluxing is continued for 3 hours after the addition is complete. Then 173 parts of water is added very carefully and the ether layer separated. The ether layer is dried over anhydrous sodium sulfate, filtered and the ether distilled. There remains 529 parts of polychloroprene diamine of molecular weight 1480 as calculated from the —NH$_2$ analysis.

B.

|  | Example 1 | Example 2 | Example 3 |
|---|---|---|---|
| Diamino polymer of chloroprene (Mol. Wt. 1,480) | 100 | 100 | 100 |
| N,N'-m-phenylene bismaleimide | 18.12 | 22.64 | 20.36 |
| Diethylene triamine | | 1.16 | 0.58 |
| 15-Minute Cure: | | | |
| Modulus—300% elongation | | 1,975 | 2,225 |
| Tensile Strength | 1,250 | 3,075 | 2,800 |
| Elongation at break | 280 | 370 | 340 |
| 30-Minute Cure: | | | |
| Modulus—300% elongation | | 2,500 | 2,625 |
| Tensile Strength | 1,325 | 2,575 | 3,025 |
| Elongation at break | 190 | 310 | 330 |

Similar results are obtained with a choroprene polymer of molecular weight 4390 and with N,N'-ethylene bismaleimide or N,N'-hexamethylene bismaleimide.

EXAMPLE 4

680 parts of isoprene and 11.3 parts of α,α'-azo-bis-isobutyronitrile are heated together in a closed vessel at 75° C. for 20 hours while agitating. The mass is cooled, vented and the excess isoprene distilled. There remains 229 parts of dicyanopolyisoprene.

100 parts of this polymer is reduced to the amine by dissolving in about 900 parts of diethylether and adding slowly to a refluxing mixture of 22.8 parts of lithium aluminum hydride and 1000 parts of diethylether under an atmosphere of nitrogen. About 15 minutes is required for the addition. The mass is then refluxed for 3 hours. After about 1.5 hours of this heating period, an additional 450 parts of ether is added to maintain fluidity of the mass. Then 250 parts of water is added very carefully to decompose residual hydride and the ether layer is separated. The ether layer is dried over anhydrous sodium sulfate, filtered and the ether distilled. The polyisoprene diamine has an iodine number of 375 and a molecular weight of 2970.

25 parts of the polyisoprene diamine, 0.173 part of diethylene triamine and 2.93 parts of N,N'-m-phenylene-bismaleimide are milled together. The mixture is cast into a film and heated at 140° C. for 15 minutes. The resulting elastomer has the following properties:

Tensile strength at break, lbs. per sq. in_____ 375
Modulus at 300% elongation, lbs. per sq. in_____ 300
Elongation at break, percent_____ 320

EXAMPLE 5

63 parts of a dicyanopolyisoprene of average molecular weight 1931 prepared similarly to Example 4, 77 parts of distilled, air-free methylcyclohexane, 20 parts of Raney nickel, 2 parts of a palladium catalyst supported on carbon and 50 parts of liquid ammonia are placed in a hydrogenation vessel. The vessel is heated to 125° C. and agitated while hydrogen under a pressure of 6000 lbs. per sq. in. is maintained in the vessel. After 5 hours under these conditions the temperature is raised to 250° C. and the hydrogen pressure is increased to 12,000 lbs. per sq. in. and maintained there for 5 hours. The charge is cooled, the pressure vented and the vessel discharged under nitrogen. The catalyst is filtered off and the solvent distilled. There remains 56 parts of water-white polyisoprene diamine. The nitrogen analysis of 1.32% indicates a molecular weight of 2121. Infrared analysis shows the absence of —CN groups and only a very minor amount of C=C unsaturation.

25 parts of the hydrogenated polyisoprene diamine, 0.176 part of diethylene triamine and 4.26 parts of N,N'-m-phenylene-bismaleimide are milled together and cast into a thin film. The film is cured by heating at 140° C. for 15 minutes. The resulting elastomer shows the following properties:

Tensile strength at break, lbs. per sq. in_____ 1325
Modulus at 300% elongation, lbs. per sq. in_____ 625
Elongation at break, percent_____ 430

The novel liquid compositions of the present invention which are capable of being cured merely by the application of heat have many varied uses. They form the basis for a casting technique for making rubber articles and are also uniquely valuable for other purposes, such as caulking and crack-filling where shrinkage is undesirable. These compositions may be used for forming supported or unsupported films, for coating fabrics or solid surfaces, and for forming adhesive bonds between a wide variety of plastics, elastomers, fabrics, metals, wood, leather, ceramics and the like. Filaments having desirable properties may also be prepared from these compositions.

The liquid compositions containing only the bismaleimide and organic diamine on heating yield essentially a linear product which, if desired, may be cured by treating with an organic diisocyanate. Thus, the diisocyanate may be milled with the linear product on a rubber roll mill, followed by a heating step to effect a cure. In the instances where the linear product is in the form of a thin film, a cure may be obtained by exposing the film to diisocyanate vapors.

As many widely different embodiments of this invention may be made without departing from the spirit and scope thereof, it is to be understood that this invention is not limited to the specific embodiments thereof except as defined in the appended claims.

What is claimed is:

1. A liquid composition comprising an intimate mixture of (1) a bismaleimide of the structure

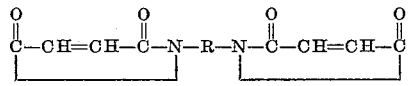

wherein R is a bivalent hydrocarbon radical, and (2) a liquid organic diamine, H$_2$N—R'—NH$_2$, having a molecular weight between 750 and 12,000, and wherein R' is a bivalent polymeric hydrocarbon radical selected from the group consisting of (a) radicals formed by the polymerization of ethylenically unsaturated monomers, at least 50% of which are conjugated dienes, and (b) the corresponding hydrogenated radicals; said ethylenically unsaturated monomers being selected from the group consisting of hydrocarbon monomers and halogen-substituted hydrocarbon monomers.

2. A liquid composition comprising an intimate mixture of (1) a bismaleimide of the structure

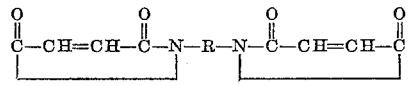

wherein R is a bivalent hydrocarbon radical, and (2) a liquid organic diamine, H$_2$N—R'—NH$_2$, having a molecular weight between 750 and 12,000, and wherein R' is a bivalent polymeric saturated hydrocarbon radical formed by hydrogenating the polymerization product of ethylenically unsaturated monomers, at least 50% of which are conjugated dienes, said ethylenically unsaturated monomers being selected from the group consisting of hydrocarbon monomers and halogen-substituted hydrocarbon monomers.

3. A liquid composition, comprising an intimate mixture of equimolar proportions of (1) N,N'-m-phenylene bismaleimide and (2) a liquid organic polymeric diamine having a molecular weight between 750 and 12,000, the polymeric portion of said diamine being a carbon skeleton formed by the polymerization of chloroprene.

4. A liquid composition consisting essentially of an intimate mixture of (1) a bismaleimide of the structure

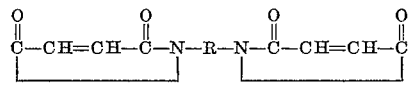

wherein R is a bivalent hydrocarbon radical, (2) a liquid organic diamine, H₂N—R'—NH₂, having a molecular weight of between 750 and 12,000, and wherein R' is a bivalent polymeric hydrocarbon radical selected from the group consisting of (a) radicals formed by the polymerization of ethylenically unsaturated monomers, at least 50% of which are conjugated dienes, and (b) the corresponding hydrogenated radicals; said ethylenically unsaturated monomers being selected from the group consisting of hydrocarbon monomers and halogen-substituted hydrocarbon monomers, and (3) an organic triamine.

5. A liquid composition consisting essentially of an intimate mixture of (1) N,N'-m-phenylene bismaleimide, (2) a liquid organic polymeric diamine having a molecular weight between 750 and 12,000, the polymeric portion of said diamine being a carbon skeleton formed by the polymerization of chloroprene, and (3) diethylene triamine.

6. An elastomer obtained by heating the liquid compositions of claim 1.

7. An elastomer obtained by heating the liquid compositions of claim 4.

No references cited.